Nov. 29, 1949 B. W. MANTLE Re. 23,175

PUMP

Original Filed June 26, 1944 2 Sheets-Sheet 1

INVENTOR.
Burr W. Mantle
BY
Wallace and Cannon
ATTORNEYS

PUMP

Original Filed June 26, 1944 2 Sheets-Sheet 2

INVENTOR.
Burr W. Mantle
BY
Wallace and Cannon
ATTORNEYS

Reissued Nov. 29, 1949 Re. 23,175

UNITED STATES PATENT OFFICE 23,175

PUMP

Burr W. Mantle, Pittsford, N. Y., assignor to American Brake Shoe Company, Wilmington, Del., a corporation of Delaware Original No. 2,427,060, dated September 9, 1947, Serial No. 542,127, June 26, 1944. Application for reissue January 15, 1949, Serial No. 71,141

5 Claims. (Cl. 230—30)

This invention relates to pumps for pumping air or gas and more particularly to the unloading of such pumps when the pumping action thereof is to be suspended.

Air or gas pumps of the kind to which this invention relates may be utilized for different purposes such as the production of a supply of compressed air or the evacuation of air or the like to produce a reduced pressure or partial vacuum.

In many instances such pumps are continuously operated as, for example, where such a pump serves as an air compressor used in connection with paint spraying equipment, it being advantageous so to do since this avoids frequent starting and stopping of the pump. In such an instance, however, it has been found to be desirable to unload the pump when the desired pressure condition has been produced by the pump. Thus, for example, when the supply of air under pressure in a supply tank or the like has been built up by such a pump to the desired pressure level it is desirable to suspend the pumping action of the pump. Among ways in which it has been proposed heretofore to thus unload or suspend the pumping action of a pump or compressor in such and related circumstances has been to close off the inlet to the pump so that as the pump continues to operate with the inlet so closed, and when this is done a vacuum is created in the cylinder head or heads in the pump. This, however, has been found to be disadvantageous because, among other reasons, when a vacuum is created in the cylinder head or heads in this manner, the pressure in the crank case of the pump has been effective to force the lubricant past the piston or pistons of the pump into the cylinder head or heads and, particularly in the case of pumps used as air compressors in connection with paint spray equipment, the presence of lubricant in the cylinder head or heads is objectionable since such lubricant may become mixed with the air being discharged from the compressor.

However, since an expeditious way in which to unload a pump is to close off the inlet thereto, it is among the objects of my invention to enable a pump to be unloaded by closing off the inlet thereof but to, at the same time, avoid the likelihood that lubricant will be forced into the cylinder head or heads of the pump.

It has recently become customary in the compressor art to resort to a so-called sealed crank case and the present invention is particularly adapted for use with a compressor embodying such a crank case since it is among the objects of my invention to equalize pressure on opposite sides of a piston operating in a cylinder of a pump or compressor when such pump or compressor is unloaded by closing off the inlet thereto, and objects ancillary to the foregoing are to establish an interconnection between the inlet leading to a cylinder head of a pump or compressor and the crank case thereof of the closed or sealed type so as to enable a vacuum to be created in the crank case simultaneously with the creation of a vacuum in the cylinder head when the inlet to the pump or compressor is closed off; and to insure that when air is withdrawn from the crank case of a pump or compressor under the aforesaid circumstances, lubricant from the crank case will not be drawn into the cylinder head of the pump or compressor through the aforesaid interconnection.

Further and more specific objects of the present invention are to establish intercommunication between the portion of a pump or compressor leading to an inlet valve thereof and the sealed or closed crank case of the pump or compressor by opening communication into the crank case adjacent to one of the bearings for the crank shaft so that air withdrawn from the crank case will flow through such bearing; and to utilize a tapered roller bearing in such position that air withdrawn from the crank case in the course of unloading the pump or compressor will flow through such tapered roller bearing to thereby have entrained lubricant and the like removed therefrom prior to the time the air passes through the inlet valve and cylinder head of the pump or compressor.

Still further objects of the invention are to utilize pressure responsive means for controlling operation of the means effective to bring about unloading of a pump or compressor by closing off the inlet thereof; to normally urge means effective to close off the inlet of a pump or compressor into open position; and to move such means into closed position when a predetermined pressure condition has been established in the supply tank with which the pump or compressor is associated.

Other and further objects of the present invention will be apparent from the following description and claims and are illustrated in the accompanying drawing which, by way of illustration, shows preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Figure 1:
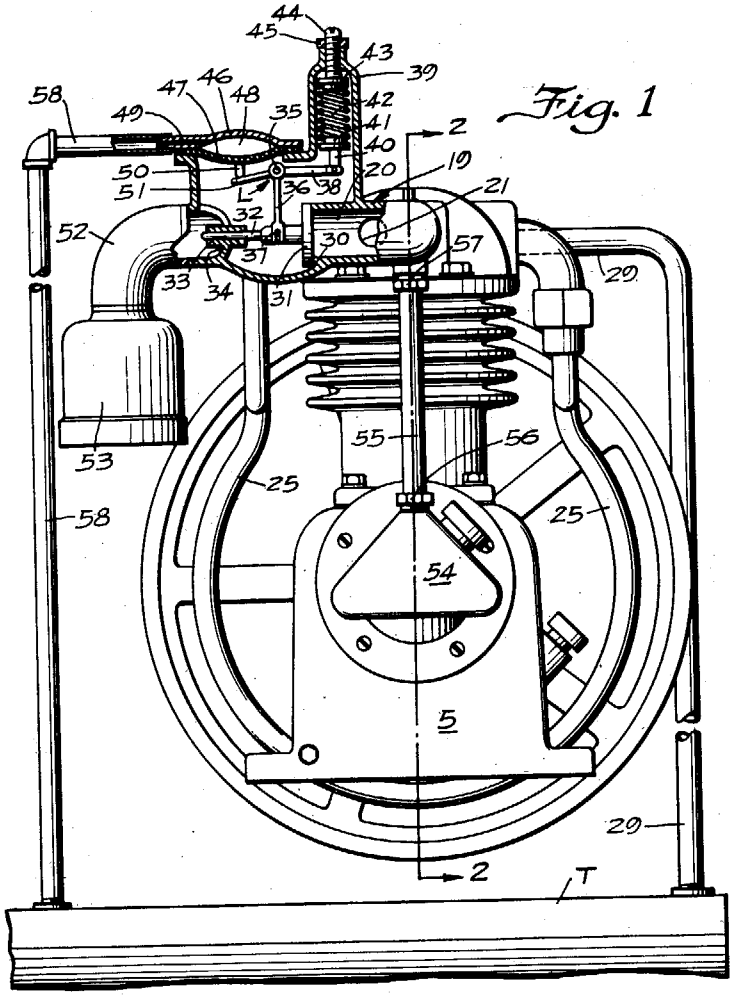
Fig. 1 is an end elevational view illustrating the invention as embodied in an air compressor system, certain parts being broken away to illustrate the novel apparatus of the present invention.
Figure 2:
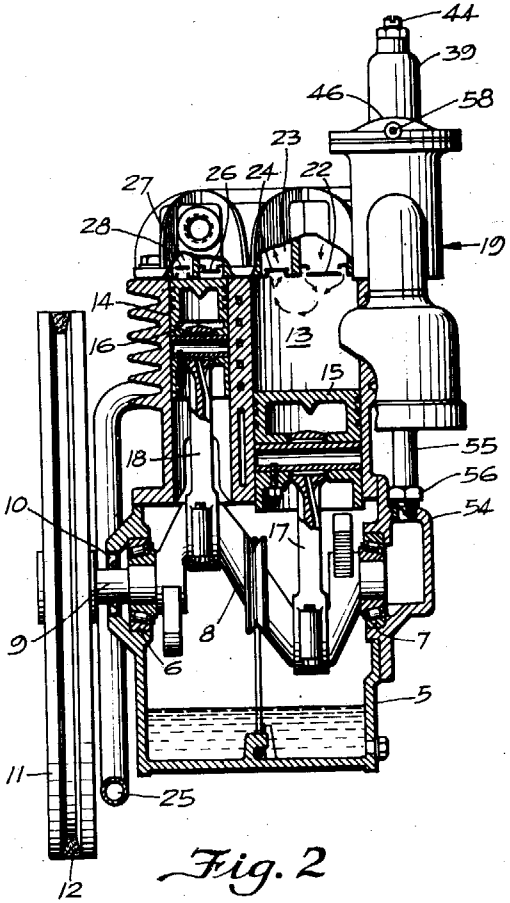
Fig. 2 is a vertical sectional view taken substantially on the line 2—2 in Fig. 1.
Figure 3:
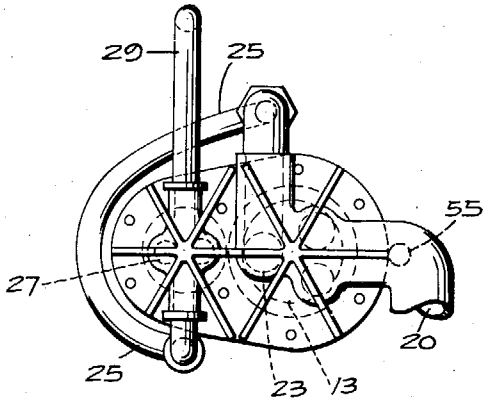
Fig. 3 is a plan view of the compressor illustrated in Figs. 1 and 2.

For purposes of disclosure, the invention is illustrated in Figs. 1 to 3 of the drawings as embodied in an air compressor system having a two-stage compressor, but it will be understood that my invention is suitable for use either with a single stage compressor or with any other arrangement of a multiple stage compressor or other pump, in accordance with my invention, when the pump or compressor is to be unloaded, communication is shut off between the intake and the cylinder of the single stage pump, or between the intake and the cylinder of the first stage of a multi-stage pump.

Referring to Figs. 1 to 3 of the accompanying drawings, the compressor embodies a crank case 5 which is desirably of the closed or sealed type. Bearings 6 and 7 are provided in the crank case 5 and the crank shaft 8 is journaled in these bearings. In this present instance the power or driving means for the pump is disposed outside of the crank case, and an extension 9 of the crank shaft 8 is accordingly extended outwardly of the bearing 6 through a suitable shaft seal 10 mounted in the crank case 5 outwardly of the bearing 6 and which is effective to prevent flow of air into and from the crank case 5 past the extension 9 of the crank shaft 8. In the present instance a pulley 11 is mounted on the extension 9 of the crank shaft outwardly of the crank case 5 and a belt 12 is passed about the pulley 11 and leads to a suitable source of power such as an electric motor, whereby the crank shaft 8 may be set in rotation when the compressor is to be operated.

In the illustrated compressor the first stage is afforded by the cylinder 13 and the second stage is afforded by the cylinder 14, the piston 15 being reciprocal in the cylinder 13 and the piston 16 being reciprocal in the cylinder 14, such pistons being connected to the throws of the crank shaft 8 respectively by the connecting rods 17 and 18.

A casing generally indicated by 19 includes an air inlet passage 20 from which a passage 21 leads to the intake valve 22 (which is partially diagrammatically illustrated in Fig. 2) of the cylinder 13. The outlet passage 23 leads from the outlet valve 24 of the cylinder 13 (which outlet valve is also partially diagrammatically illustrated) to one end of the inter-cooler 25 which in turn leads to the inlet valve 26 of the cylinder 14. The outlet passage 27 leads from the outlet valve 28 of the cylinder 14 to the fluid discharge line 29 which leads to a storage tank T or the like where air under pressure is stored the valves 26 and 28 also being partially diagrammatically illustrated.

It should be observed that the pressure in the tank T is maintained by the valves as 28 of the compressor, such valve means serving in effect as check valve means in a known manner.

A valve seat 30 is provided at the free end of the inlet passage 20 and a valve member 31 is adapted to cooperate therewith so that when the valve member 31 is engaged with the valve seat 30, flow through the inlet passage 20 is closed off. The valve member 31 includes a stem 32 that is extended through and supported by a bearing 33 carried by a bracket 34 in the casing 19. A shaft 35 extends across and is carried by the casing 19 and supports a three armed lever L for rocking movement in the casing 19. The arm 36 of this three arm lever L is connected to the stem 32 of the valve member 31 by a suitable yoke connection 37, while the arm 38 of this three arm lever extends beneath a housing 39 formed on the casing 19. A link 40 is pivotally connected to the free end of the arm 38 and carries a spring pad 41 against which one end of a spring 42 bears. The spring 42 is mounted within the housing 39 and the opposite end thereof bears against a spring pad 43 carried by a screw stud 44 which is mounted in a tapped opening provided at the upper end of the housing 39, the screw 44 thereby being extended outwardly of the housing 39. A lock nut 45 cooperates with the screw 44 and the adjacent end of the housing 39 to secure the screw 44 in adjusted positions.

A domed pad 46 is provided on the casing 19 and the means which secure this pad in position is also effective to secure a diaphragm 47 in position in the casing 19, the pad and diaphragm cooperating to define a pressure chamber 48 to which an inlet passage 49 is directed. A stud 50 on the diaphragm 47 bears on the arm 51 of the three arm lever L, and when a predetermined pressure is built up in the chamber 48, this stud 50 is effective on the arm 51 and through the arm 36 of the lever L to urge the valve member 31 into engagement with the valve seat 30 to thereby shut off flow through the inlet passage 20. Normally, however, the spring 42 is effective on the arm 38 to urge the valve member 31 away from the valve seat 30 to thereby permit flow through the inlet passage 20. The screw 44 is disposed in such adjusted position that the spring 42 is rendered effective to maintain the valve member 31 unseated from the valve seat 30 until a predetermined pressure has been built up in the chamber 48.

An inlet pipe 52 leads to the interior of the casing 19 from, in the present instance, a combined air filter and muffler 53 and the valve member 31 is disposed between the inner end of the pipe 52 and the passage 20 so that when the valve member 31 seats on the valve seat 30 flow of air to the passage 20 from the filter and muffler is shut off.

A cap 54 is mounted on the end of the crank case 5 outwardly of housing or the bearing 7 and is effective to seal and close this end of the crank case 5. A pipe 55 leads from the interior of the cap 54 to the inlet passage 20, opposite ends of this pipe 55 being secured in position by suitable fittings 56 and 57. The pipe 55 opens into the inlet passage 20 behind the valve seat 30 so that when the valve member 31 is engaged with this valve seat, flow of air from the pipe 52 to the pipe 55 is closed off. However, when the valve member 31 is disengaged from the valve seat 30, air may flow from the pipe 52 through a passage 20 and pipe 55 into the cap 54 and thence into the crank case 5, whereby a breathing arrangement for the crank case is afforded.

It will be noted that the anti-friction bearing 7 as herein shown is of the tapered roller bearing type and I have found it advantageous to resort to a bearing of this character and to provide a cap as 54 or other connection to the interior of the crank case 5 adjacent to such a bearing for so to do insures that air withdrawn from the interior of the crank case 5 and up through the pipe 55 will flow through the tapered roller bearing 7. As the air flows through such a tapered roller bearing, entrained lubricant or the like is effectively removed therefrom so as to thereby be prevented from passing to the inlet passage 20 and thence into a cylinder as 13. Thus the anti-friction bearing as 7, in effect, serves as a means for filtering or removing lubricant from the air that passes therethrough.

This filtering or lubricant removing action is dependent upon the rapid rolling movement of the spaced rollers of the bearing 7 in the annular space between the inner and outer races of the bearing, and hence the term "anti-friction bearing" as used herein is to be taken as meaning a bearing in which spaced rolling elements disposed in the annular space between inner and outer races afford spaces through which air may pass while at the same time attaining a filtering or oil removing action by reason of the rapid rolling movement of the rolling elements.

In the present instance a pipe 58 leads from the inlet passage 49 to the tank T to which the discharge pipe 29 is connected, and thereby a connection is established between the storage receptacle as the tank T and the chamber 48. Therefore, when a predetermined pressure is attained in the tank T and it is advantageous to unload the compressor, the predetermined pressure will be effective on the diaphragm 47 to overcome the effect of the spring 42 and thereby cause the valve member 31 to seat on the valve seat 30. This shuts off flow of air through the inlet passage 20 and as the piston 15 continues to reciprocate in the cylinder 13 a vacuum is drawn in this cylinder. Moreover, such reciprocation of the piston 15 in the cylinder 13 withdraws air from the interior of the crank case 5 through the bearing 7, the interior of the cap 54 and pipe 55, whereby a vacuum is drawn in the interior of the crank case 5, such vacuum being created simultaneously with the creation of a vacuum in the head of the cylinder 13. Furthermore, when the valve member 31 seats on the valve seat 30 the supply of air to the second stage of the illustrated two stage compressor is also closed off so that immediately after a vacuum is created in the head of the cylinder 13 a vacuum is also created in the head of the cylinder 14. However, by the time a vacuum is created in the heads of these cylinders a vacuum will also be created in the crank case 5, wherefore pressure on opposite sides of the pistons 15 and 16 is equalized so that there is no tendency for lubricant to be forced up past the pistons and into the heads of the cylinders 13 and 14, and I have found that this arrangement is effective to insure against lubricant collecting in the heads of the cylinders when the compressor is unloaded by closing off the inlet thereof.

Figure 4:
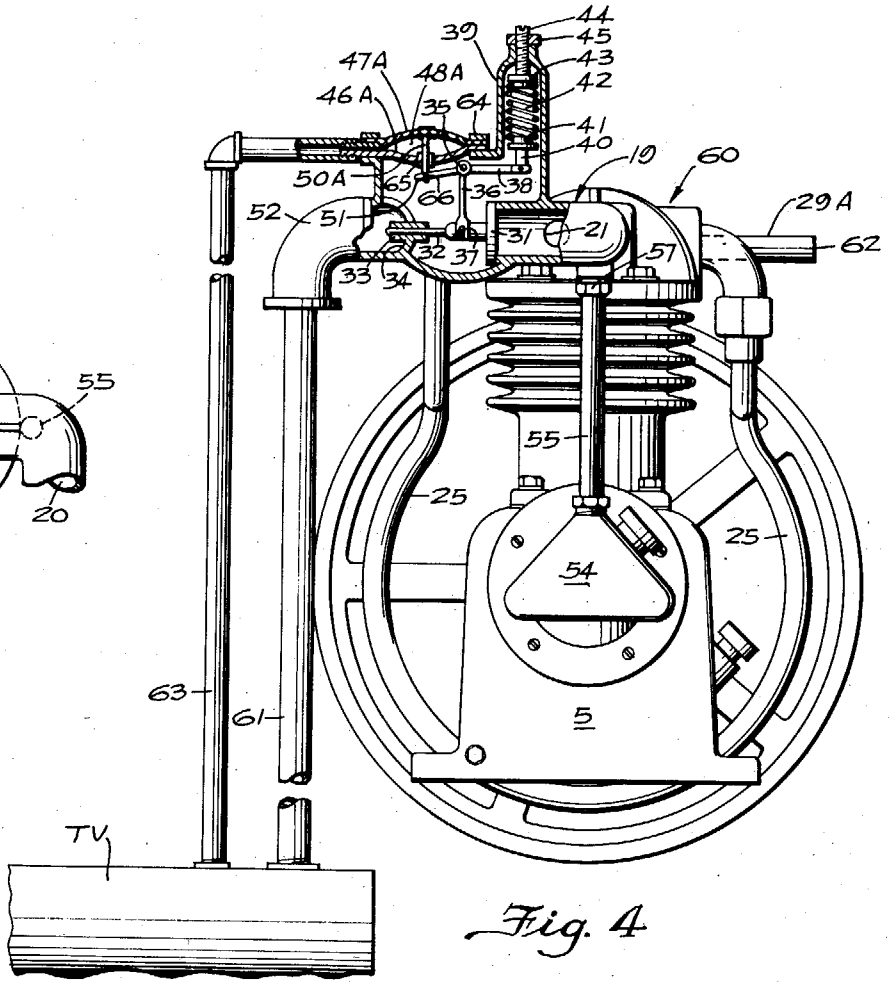
Fig. 4 is a view similar to Fig. 1 and illustrating the invention as embodied in an apparatus for producing a vacuum.

It has been pointed out hereinbefore that the present invention may be utilized in connection with pumps other than compressors, and one such instance is found where a pump is being used to produce vacuum or low pressure. Thus, in Fig. 4 of the drawings I have illustrated an embodiment of the invention that comprises a two-stage pump 60 generally similar to the compressor shown in Figs. 1 to 3, and the pump 60 is associated with a vacuum tank TV to withdraw air from the tank and thereby establish a low pressure or vacuum in the tank TV. In most of its structural features the pump 60 is similar to the compressor of Figs. 1 to 3, and similar reference characters are employed as to such corresponding parts of the pump 60. It will be observed, however, that the air cleaner 53 has been eliminated in the embodiment shown in Fig. 4, and the intake pipe 52 is connected by a pipe 61 to tank TV. Thus, during normal operation of the pump 60 air is withdrawn from the tank TV, and such air, after passing through the pump 60 is discharged to atmosphere through the discharge pipe 29A, which differs from the pipe 29 of the other embodiment in that it is terminated at 62.

When the pump 60 is thus utilized to produce vacuum or low pressure in the tank TV, the pumping action of the pump 60 is suspended when the pressure within the tank TV has reached the desired low level, and this may be accomplished under the present invention by unloading the pump in substantially the same manner as in the previously described embodiment. Hence when the pumping action is to be suspended, the valve 31 is closed, thereby to cut off the flow of air through the inlet passage 21 and the intake valve 22. When this occurs, the production of vacuum or reduced pressure in the heads of the cylinders serves through the connection 55 to correspondingly reduce the pressure in the crank case, and hence flow of oil from the crank case past the pistons and into the cylinder heads is prevented.

The requisite operation of the valve 31 is attained through means that are similar to the means used in the other embodiment of the invention, but the functioning of such means is reversed so as to close the valve 30 in response to reduction of pressure in the tank TV. Thus a pipe 63 is extended from the tank TV and is connected to a pressure chamber 48A, this pressure chamber 48A being formed by a rigid casting, 46A that is concave upwardly and which has a diaphragm 47A secured across its upper concave face by means such as a clamping ring 64. The diaphragm 47A has a connecting rod 50A secured centrally thereto and extended downwardly through a packing gland 65 in the lower wall or casting 46A of the chamber 48A. The extended lower end of the connecting rod 50A is pivoted to the arm 51 of the lever L, as at 66. Thus when the pressure in the tank TV and the chamber 48A reaches the desired low pressure, the diaphragm 47A is drawn downwardly so as to rotate the lever L in a counterclockwise direction and close the valve 31. This unloads the pump 60 as hereinbefore described. When the pressure in the tank TV increases above a predetermined level as determined by the adjustment of the spring 42, this spring acts to open the valve 31, and the pump 60 again becomes active to reduce the pressure in the tank TV.

From the foregoing description it will be apparent that the present invention enables air pumps, compressors, and the like to be unloaded in an efficient and practical manner during continuous operation thereof, and this unloading is effected in such a way that flow of lubricant past the pistons and into the pump head is prevented.

Such control of the oil flow or distribution insures where a pump is used as a compressor the compressed air output will be free from oil or oil mist. In attaining this result the equalization of air pressures on opposite sides of each piston prevents flow of oil through the cylinders and into the pump head, while the rotating anti-friction bearing at one end of the crank case serves to remove any oil mist from such air as is withdrawn from the crank case during an unloading period.

It will be also be evident that the present invention is of particular utility where a pump is being used to produce low pressure or vacuum, for under such circumstances the reduced pressures that are effective at substantially all time in the cylinder heads of the pump are applied also to the crank case in such a manner that the pressures on opposite sides of the pistons are substantially equalized during normal pumping operations as well as during unloading periods.

Thus while I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. In a pump, a cylinder block having a cylinder formed therein, a piston in said cylinder, walls affording a sealed crankcase associated with said block at one end of said cylinder, a crankshaft in said crankcase and operatively connected with said piston to reciprocate the same, bearing means for said crankshaft including at least one anti-friction bearing supporting said crankshaft in a wall of said crankcase, a cylinder head closing one end of said cylinder and cooperating therewith to form a compression chamber, said cylinder head having intake and discharge ports therein, check valves controlling said ports, means providing an inlet passage connected to said inlet port, means providing discharge passage connected to said discharge port, an unloading valve disposed in said inlet passage in spaced relation to said inlet port and operable when closed to prevent flow of fluid through said inlet passage to said inlet port, and an equalizing duct connected at one end to said inlet passage between said inlet port and said unloading valve and connected at its other end to the interior of said crankcase through said anti-friction bearing to thereby withdraw air from the crankcase through said bearing and substantially equalize pressure conditions in said crankcase with pressure conditions in said chamber when said unloading valve is closed.

2. In a pump, a cylinder block having a cylinder formed therein, a piston in said cylinder, walls affording a crankcase associated with said block at one end of said cylinder, a crankshaft in said crankcase and operatively connected with said piston to reciprocate the same, said crankshaft being extended at one end through a first wall of said crankcase and being supported in said wall by a sealed bearing, an anti-friction bearing supporting the other end of said crankshaft in a second wall of said crankcase, said anti-friction bearing affording spaces between the elements thereof through which air may pass into or out of said crankcase, a cylinder head closing one end of said cylinder and cooperating therewith to form a compression chamber, said cylinder head having intake and discharge ports therein, check valves controlling said ports, means providing an inlet passage connected to said inlet port, means providing discharge passage connected to said discharge port, an unloading valve disposed in said inlet passage in spaced relation to said inlet port and operable when closed to prevent flow of fluid through said inlet passage to said inlet port, an equalizing duct connected at one end to said inlet passage between said inlet port and said unloading valve, and a housing covering said anti-friction bearing on the outside of said second wall and connected to the other end of said duct so that said duct communicates with said crankcase through the spaces between the elements of said anti-friction bearing, said equalizing being operable to substantially equalize pressure conditions in said crankcase with pressure conditions in said chamber when said unloading valve is closed, and said anti-friction bearing being operable to remove oil and like substances from the air withdrawn from the crankcase through said duct.

3. In a pumping system, a pump comprising piston and cylinder pumping means providing a compression chamber with valved inlet and outlet ports, means providing inlet and discharge passages associated respectively with said valved inlet and outlet ports, a sealed crankcase associated with said pumping means and having a crankshaft therein drivingly connected with said pumping means, bearing means for said crankshaft including an anti-friction bearing supporting at least one end of said crankshaft in a wall of said crankcase, an unloading valve disposed in said inlet passage in spaced relation to said inlet port and operable when closed to prevent flow of fluid through said inlet passage to said inlet port, means affording an equalizing duct connected at one end to said inlet passage at a point located between said unloading valve and said inlet port and connected at its other end to said crankcase to communicate therewith through said anti-friction bearing so that said pumping means withdraws air from said crankcase through said anti-friction bearing means so as to remove oil and mist from such air and by the withdrawal of such air reduces the pressure in said crankcase when said unloading valve is closed, a closed tank, a connection between said tank and one of said passages whereby operation of said pumping means acts to change the pressure in said tank in a predetermined sense, and pressure operated means subjected to the pressure in said tank and operable when said pressure is varied in said predetermined sense to a predetermined value to close said unloading valve.

4. In a pump, a cylinder block having a cylinder formed therein, a piston in said cylinder, walls affording a crankcase associated with said block at one end of said cylinder, a crankshaft in said crankcase and operatively connected with said piston to reciprocate the same, said crankshaft being extended at one end through a first wall of said crankcase and being supported in said wall by a sealed bearing, an anti-friction bearing supporting the other end of said crankshaft in a second wall of said crankcase, said anti-friction bearing having spaced inner and outer races and spaced rolling elements between said races affording spaces between said rolling elements thereof through which air may pass into or out of said crankcase, a cylinder head closing one end of said cylinder and cooperating therewith to form a compression chamber, said cylinder head having intake and discharge ports therein, check valves controlling said ports, means providing an inlet passage connected to said inlet port, means providing discharge passage connected to said discharge port, an unloading valve disposed in said inlet passage in spaced relation to said inlet port and operable when closed to prevent flow of fluid through said inlet passage to said inlet port, an equalizing duct connected at one end to said inlet passage between said inlet port and said unloading valve, and a housing covering said anti-friction bearing on the outside of said second wall and connected to the other end of said duct so that said duct communicates with said crankcase through the spaces between the elements of said anti-friction bearing, said equalizing being operable to substantially equalize pressure conditions in said cranckcase with pressure conditions in said chamber when said unloading valve is closed, and said anti-friction bearing being operable to remove oil and like substances from the air withdrawn from the crankcase through said duct.

5. In a pumping system, a pump comprising piston and cylinder pumping means providing a compression chamber with valved inlet and outlet ports, means providing inlet and discharge passages associated respectively with said valved inlet and outlet ports, a sealed crankcase associated with said pumping means and having a crankshaft drivingly connected with said pumping means, at least one anti-friction bearing supporting said crankshaft, an unloading valve disposed in said inlet passage in spaced relation to said inlet port and operable when closed to prevent flow of fluid through said inlet passage to said inlet port, means affording an equalizing duct connected at one end to said crankcase through said anti-friction bearing and at its other end to said inlet passage at a point located between said unloading valve and said inlet port so that said pumping means withdraws air from said crankcase and reduces the pressure in said crankcase when said unloading valve is closed, a closed tank, a connection between said tank and one of said passages whereby operation of said pumping means acts to change the pressure in said tank in a predetermined sense, and pressure operated means subjected to the pressure in said tank and operable when said pressure is varied in said predetermined sense to a predetermined value to close said unloading valve.

BURR W. MANTLE.

REFERENCES CITED

The following references are of record in the file of this patent:

UNITED STATES PATENTS

| Number | Name | Date |
|---|---|---|
| 2,048,025 | Philipp | July 21, 1936 |
| 2,074,323 | Bogerd | Mar. 23, 1937 |
| 2,150,487 | Brown | Mar. 14, 1939 |
| 2,234,488 | Dick | Mar. 11, 1941 |
| 2,244,828 | Dick | June 10, 1941 |
| 2,274,337 | Ritter | Feb. 24, 1942 |
| 2,301,656 | Hirche | Nov. 10, 1942 |